US012333379B2

United States Patent
Flöther et al.

(10) Patent No.: US 12,333,379 B2
(45) Date of Patent: Jun. 17, 2025

(54) OPTIMIZED SELECTION OF DATA FOR QUANTUM CIRCUITS

(71) Applicant: International Business Machines Corporation, Armonk, NY (US)

(72) Inventors: Frederik Frank Flöther, Schlieren (CH); Michele Grossi, Prevessin-Möens (FR); Vaibhaw Kumar, Frederick, MD (US); Robert E. Loredo, North Miami Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 646 days.

(21) Appl. No.: 17/540,485

(22) Filed: Dec. 2, 2021

(65) Prior Publication Data

US 2023/0177372 A1    Jun. 8, 2023

(51) Int. Cl.
  *G06N 10/00* (2022.01)
  *G06F 11/34* (2006.01)
  *G06F 18/2135* (2023.01)

(52) U.S. Cl.
  CPC ........ *G06N 10/00* (2019.01); *G06F 11/3428* (2013.01); *G06F 18/2135* (2023.01)

(58) Field of Classification Search
  CPC ...... G06N 10/00; G06N 3/0455; G06N 3/092; G06N 10/80; G06N 20/00; G06F 11/3428; G06F 18/2135
  See application file for complete search history.

(56) References Cited

U.S. PATENT DOCUMENTS

| 7,620,672 B2 | 11/2009 | Tucci |
| 10,275,721 B2 | 4/2019 | Dukatz et al. |

(Continued)

FOREIGN PATENT DOCUMENTS

| CN | 112862104 A | 5/2021 |
| KR | 20210081859 A | 7/2021 |
| WO | 2014210368 A1 | 12/2014 |

OTHER PUBLICATIONS

Khan et al., "K-means clustering on noisy intermediate scale quantum computers." arXiv preprint arXiv:1909.12183 (2019). 12 pages.

(Continued)

*Primary Examiner* — Nha T Nguyen
(74) *Attorney, Agent, or Firm* — Amin, Turocy & Watson, LLP

(57) ABSTRACT

To obtain meaningful computational results despite limits on the amount of data that can be input to a quantum computer, a data selection system uses an iterative approach to select a suitable subset of data to be input to a quantum device for processing by a quantum algorithm. The system compresses and clusters a data set according to a task-specific distribution criteria and selects a subset of this clustered data corresponding to representative cases of the data. The selected subset is processed by the quantum device and the system generates a metric score based on the degree to which the results satisfy a performance criterion. The selected subset is refined over multiple iterations based on successive metric scores until a termination criterion is reached, and the final selected subset of data is used as input to the quantum computer for execution of the processing task.

19 Claims, 12 Drawing Sheets

(56) References Cited

U.S. PATENT DOCUMENTS

| | | | |
|---|---|---|---|
| 10,318,881 B2 | 6/2019 | Rose et al. | |
| 10,803,395 B2 | 10/2020 | Pistoia et al. | |
| 11,113,621 B2 | 9/2021 | Cortese et al. | |
| 11,237,807 B1* | 2/2022 | Rao | G06F 11/3409 |
| 11,651,276 B2 | 5/2023 | Ravizza et al. | |
| 2018/0276555 A1* | 9/2018 | Weichenberger | G06N 10/60 |
| 2020/0234172 A1* | 7/2020 | King | G06N 10/60 |
| 2020/0265333 A1 | 8/2020 | Toresh et al. | |
| 2020/0285947 A1 | 9/2020 | Gunnels et al. | |
| 2020/0311107 A1* | 10/2020 | Crawford | G06F 16/285 |
| 2021/0056455 A1 | 2/2021 | Shehab | |
| 2021/0374862 A1* | 12/2021 | Ramanathan | G06N 5/01 |
| 2022/0318664 A1* | 10/2022 | Gadi | G06F 18/22 |
| 2022/0374655 A1* | 11/2022 | Lowe | G06N 20/10 |
| 2024/0311668 A1* | 9/2024 | Jones | G06N 10/20 |

OTHER PUBLICATIONS

Harrow "Small quantum computers and large classical data sets." arXiv preprint arXiv:2004.00026 (2020). 25 pages.

Ruslan et al., "A hybrid approach for solving optimization problems on small quantum computers." Computer 52, No. 6 (2019): 18-26. 7 pages.

Sim et al., "A framework for algorithm deployment on cloud-based quantum computers." arXiv preprint arXiv:1810_10576 (2018). 10 pages.

McCaskey et al., "XACC: a system-level software infrastructure for heterogeneous quantum-classical computing." Quantum Science and Technology 5, No. 2 (2020): 024002. 17 pages.

Cerezo et al., "Variational quantum algorithms." Nature Reviews Physics (2021): 1-20. 33 pages.

Zoufal et al., "Quantum generative adversarial networks for learning and loading random distributions." npj Quantum Information 5, No. 1 (2019): 1-9. 9 pages.

Karimi et al., "Boosting quantum annealer performance via sample persistence." Quantum Information Processing 16, No. 7 (2017): 166.

Bian et al., "Mapping constrained optimization problems to quantum annealing with application to fault diagnosis." Frontiers in ICT 3 (2016): 14.

Yoshioka et al., "Transforming generalized Ising models into Boltzmann machines." Physical Review E 99, No. 3 (2019): 032113.

Bursac, et al., Purposeful Selection of Variables in Logistic Regression, Source Code for Biology and Medicine, Dec. 16, 2008 vol. 3, Article 17, pages.

Recursive Feature Elimination with Cross-Validation, Retrieved from: Recursive feature elimination with cross-validation—scikit-learn 1.6.1 documentation, 2007, 4 pages.

Schuld, et al., Quantum Ensembles of Quantum Classifiers, Scientific Reports, vol. 8, Article 2772, Feb. 9, 2018, 12 pages.

* cited by examiner

OPTIMIZED SELECTION OF DATA FOR QUANTUM CIRCUITS

BACKGROUND

The subject disclosure relates to quantum computing and, more specifically, to techniques for providing reduced sets of data to quantum computing devices.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate error mitigation for quantum computing devices are described.

According to an embodiment, a system can comprise a data selection component that, for an iteration of a data selection routine, selects, from a set of data, a subset of the data to be processed by a quantum algorithm on a quantum device; and a metric assessment component that, for the iteration of the data selection routine, generates a metric score for a result of processing the subset of the data by the quantum algorithm, the metric score representing a degree to which the result satisfies a processing performance metric, wherein the data selection component modifies the subset of the data selected for a subsequent iteration of the data selection routine based on the metric score to yield a modified subset of the data, and the metric assessment component, in response to a determination that a termination criterion for the data selection routine is satisfied, outputs the modified subset of the data generated by a most recent iteration of the data selection routine as input to the quantum device.

According to another embodiment, a computer-implemented method can comprise, for respective iterations of a data selection routine: selecting, by a system from a set of data, a subset of the data to be processed by an algorithm on a quantum device; generating, by the system based on analysis of a result of processing the subset of the data by the algorithm, a metric score that represents a degree to which the result satisfies a processing performance metric; and modifying, by the system, selection of the subset of the data for a next iteration of the data selection routine based on the metric score to yield a modified subset of the data; and in response to determining that a termination criterion for the data selection routine is satisfied, outputting, by the system, the modified subset of the data generated by a most recent iteration of the data selection routine as input to the quantum device.

According to another embodiment, a computer program product can comprise a computer readable storage medium having program instructions embodied therewith. The program instructions are executable by a processor to cause the processor to, for respective iterations of a data selection routine: select, from a set of data, a subset of the data to be processed by an algorithm on a quantum device; generate, based on analysis of a result of processing the subset of the data by the algorithm, a metric score that represents a degree to which the result satisfies a processing performance metric; and modify selection of the subset of the data for a next iteration of the data selection routine based on the metric score to yield a modified subset of the data; and in response to determining that a termination criterion for the data selection routine is satisfied, output the modified subset of the data generated by a most recent iteration of the data selection routine as input to the quantum device.

DETAILED DESCRIPTION

Figure 1:
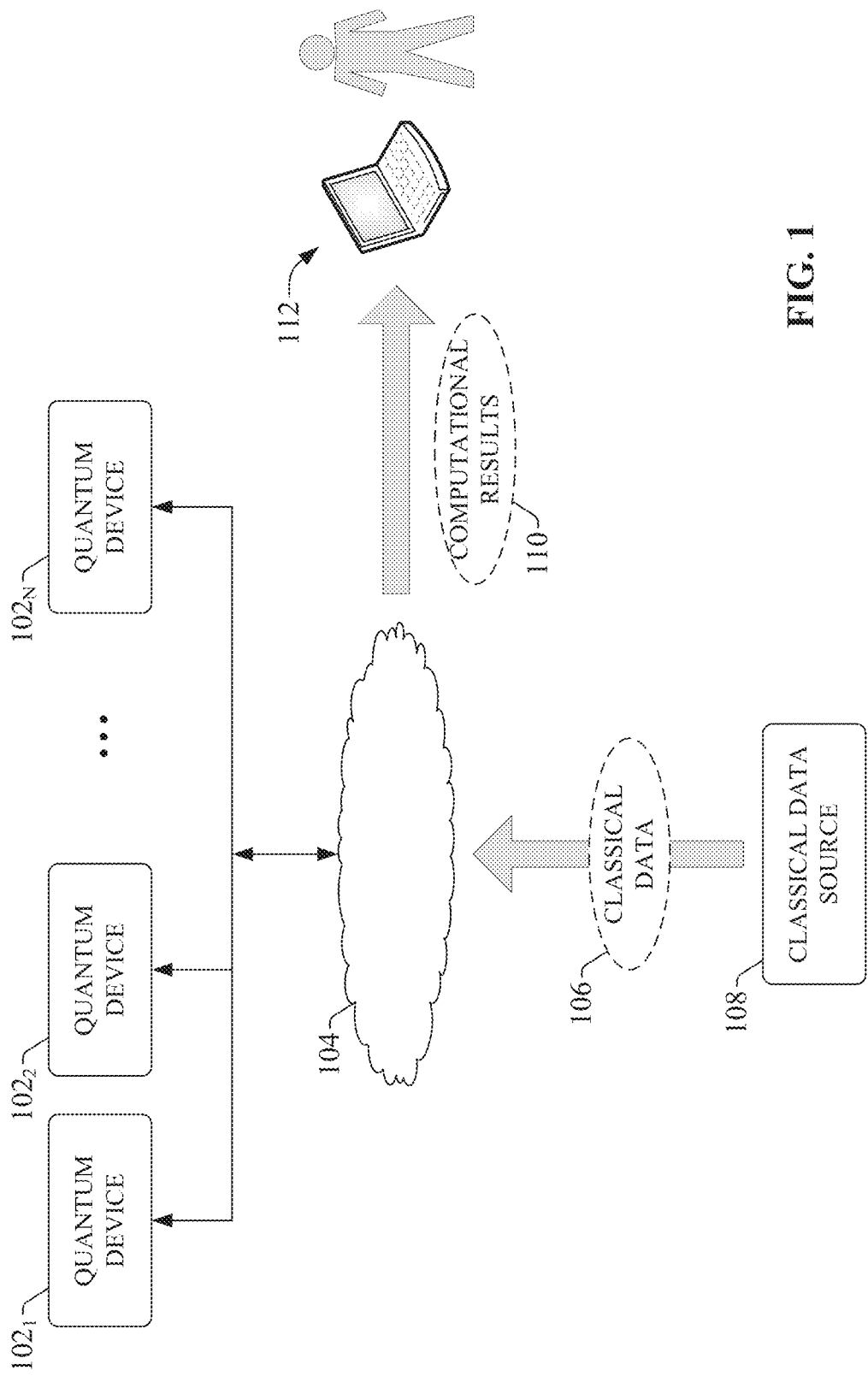
FIG. 1 is a diagram illustrating an example general architecture in which classical data is input to one or more quantum devices for processing or analysis.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Classical computers operate on binary digits (or bits) that store or represent information as binary states to perform computing and information processing functions. In contrast, quantum computing devices operate on quantum bits (or qubits) that store or represent information as both the binary states and superpositions of the binary states. To that end, quantum computing devices utilize quantum-mechanical phenomena, such as entanglement and interference.

A quantum computation uses a qubit as its essential unit instead of a classical computing bit. The qubit (e.g., quantum binary digit) is the quantum-mechanical analog of the classical bit. Whereas classical bits can employ on only one of two basis states (e.g., 0 or 1), qubits can employ on superpositions of those basis states (e.g., $\alpha|0\rangle + \beta|1\rangle$, where $\alpha$ and $\beta$ are complex scalars such that $|\alpha|^2+|\beta|^2=1$), allowing a number of qubits to theoretically hold exponentially more information than a same number of classical bits. Thus, quantum computers (e.g., computers that employ qubits instead of or in addition to classical bits) can, in theory, quickly solve problems that can be extremely difficult for classical computers. Since bits of a classical computer are simply binary digits having values of either 0 or 1, almost any device with two distinct states can serve to represent a classical bit; e.g., a switch, a valve, a magnet, a coin, or other such two-state devices. Qubits, partaking of the quantum mystique, can occupy a superposition of 0 and 1 states. When the state of the qubit is measured, the result is either 0 or 1. However, in the course of a computation, a qubit can act as if it represents a mixture of the two states; e.g., 63% 0 and 37% 1.

General quantum programs coordinate quantum and classical parts of a computation. In thinking about general quantum programs, it is instructive to identify processes and abstractions involved in specifying a quantum algorithm, transforming the algorithm into executable form, running an experiment or simulation, and analyzing the results. These processes rely on intermediate representations of a computation. An intermediate representation (IR) is neither its source language description nor the target machine instructions, but something in between. Compilers may use several IRs during a process of translating and optimizing a program. The input to these compilers is source code describing a quantum algorithm and compile time parameters, and the output is a combined quantum/classical program expressed using a high-level IR. In contrast to a classical computer, a quantum computer is probabilistic, and consequently measurements of algorithmic outputs provide a proper solution within an algorithm-specific confidence interval. The computation is then repeated until a satisfactory probable certainty of solution can be achieved.

FIG. 1 is a diagram illustrating an example, general architecture in which classical data 106 is input into one or more quantum devices 102 for processing or analysis. In this example, a set of available quantum devices $102_1$-$102_N$ (where N is an integer representing the number of available quantum devices 102) reside on a cloud platform 104 or another remotely accessible platform as a service. A user can access and utilize the computational services offered by quantum devices $102_1$-$102_N$ via a client device 112 having authorization to access the computing services. Using these services, the user can submit a set of classical data 106 from one or more data sources 108 (e.g., a website, a database, an application, or other such data sources) to a selected one or more of the quantum devices $102_1$-$102_N$, which process or analyze the data 106 using a selected quantum algorithm and return results 110 of this data processing or analysis to the user's client device 112.

In classical computing, analysis involving many variables typically requires a large amount of memory and computational power. In an example use case whereby classification algorithms are applied to large sets of data, classical computing approaches may even cause the classification algorithm to overfit to training samples and generalize poorly to new samples. Quantum computing can address some of these drawbacks to classical computing. However, in the current noisy intermediate-scale quantum (NISQ) era, it is challenging to efficiently load large volumes of data to be used as input for a quantum algorithm. This problem is particularly severe when dealing with classical, as opposed to quantum, input data.

To address these and other issues, one or more embodiments described herein are directed to systems and methods for substantially optimizing selection of a suitable subset of data (e.g., classical data or quantum data) to be input into a quantum device for execution of a given task or algorithm, such that the computational results obtained by applying a quantum algorithm to the selected subset of data satisfy a specified performance metric. These systems and methods can apply a selection routine that iteratively refines the selected subset of data to optimize the specified performance metric (e.g., accuracy, execution time, robustness, or another metric). According to the data selection approach described herein, the data is compressed and clustered, and for each iteration of the optimization routine a subset of the clustered data is selected as representative based on such factors as the computational task to be performed or type of algorithm to be applied to the data, the capabilities or constraints of the selected quantum device on which the data will be processed, or other such criteria. The representative subset of data is then provided to the selected quantum device, which applies the algorithm to the selected subset of data and returns an analytic result. The system generates a metric score for this result representing a degree to which the result satisfies the optimization metric. Based on the degree to which the optimization metric is satisfied (or the change in the metric score relative to previous metric scores), the selected subset of data is refined, and another iteration of the optimization routine is executed. This iterative process of refining the selected subset of data and updating the metric score using the refined subset repeats until a termination condition is satisfied (e.g., a specified number of iterations have been executed, the optimization metric satisfies a defined condition, a specified time duration has elapsed, or other such conditions), and the subset of the data that was selected in the final iteration is used as inputs to the quantum device for execution of the specified task.

Figure 2:
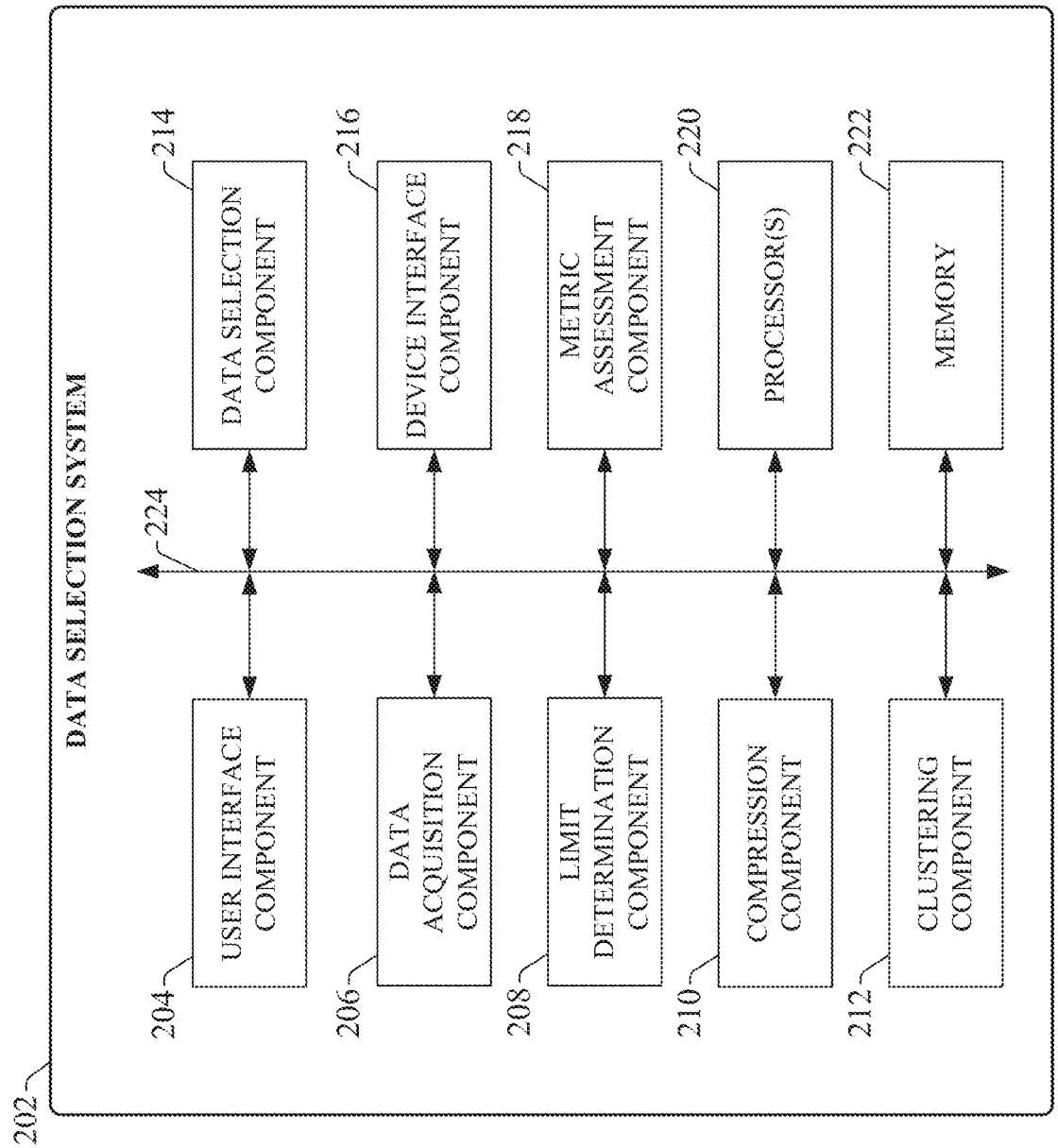
FIG. 2 illustrates a block diagram of an example, non-limiting data selection system that can select a suitable subset of classical data for input to a quantum computer or device for execution of a task or algorithm.

FIG. 2 illustrates a block diagram of an example, non-limiting data selection system 202 that can select a suitable subset of data for input to a quantum computer or device for execution of a task or algorithm. System 202 includes memory 222 for storing computer-executable components and one or more processors 220 operably coupled via one or more communication busses 224 to memory 222 for executing the computer-executable components stored in memory 222. As shown in FIG. 2, the computer-executable components include a user interface component 204, a data acquisition component 206, a limit determination component 208, a compression component 210, a clustering component 212, a data selection component 214, a device interface component 216, and a metric assessment component 218.

User interface component 204 can receive user input and render output to the user in any suitable format (e.g., visual, audio, tactile, etc.). In some embodiments, user interface component 204 can be configured to communicatively interface with a client device (e.g., a laptop computer, tablet computer, smart phone, etc.) via a hardwired or wireless connection. The user interface component 204 can then serve suitable interface displays to a client device and exchange data via these interface displays. Input data that can be received via various embodiments of user interface component 204 can include, but is not limited to, an indication of a source of data to be submitted to one or more quantum devices, an indication of a computational task to be performed on the data (e.g., classification, image encoding, credit risk analysis, or other such tasks), an identity of an algorithm to be applied to the data, a performance metric for which the data selection process is to be optimized (e.g., accuracy, processing time, etc.), or other such inputs. In some scenarios, rather than being received via user interaction, these inputs may be received via another hardware device or component, a software application, an artificial intelligence system or application. Output data rendered by various embodiments of user interface component 204 can include, but is not limited to, prompts for guiding the user through the data submission process, a metric score for the data selection process, an analytic result obtained by processing the selected subset of the data on the one or more quantum devices, or other such outputs.

Data acquisition component 206 can acquire a set of data from which the system 202 will select a suitable subset for submission to and processing by a quantum device. In some embodiments, the user can specify the source of the data (e.g., a website, a database, or other such data source) via the user interface component 204. The limit determination component 208 can determine an upper limit on the amount of data that can be submitted to a quantum device based on the capabilities or constraints of the available quantum devices.

Compression component 210 can compress the data on which the data selection analysis is to be applied. Clustering component 212 can cluster the resulting compressed data according to any suitable distribution criteria. In some cases, the distribution of the data among the resulting clusters can be a function of the type of task to be performed on the data or the algorithm to be used to process the data.

Data selection component 214 can select, for each iteration of a data selection routine, a subset of the compressed and clustered data to be submitted to an available quantum device for processing. As will be discussed in more detail below, the subset of the can be selected such that each of the clusters are represented in the subset. The device interface component 216 can be configured to exchange data with one or more available quantum devices. This can include, for example, obtaining information regarding the capabilities or constraints of respective available quantum devices (e.g., a supported number of qubits, a noise level, or other such quantum device properties), submitting selected subsets of the data to the quantum devices, and receiving processing results from the quantum devices.

Metric assessment component 218 can determine, for respective iterations of the data selection routine, a metric score representing a degree to which the selected subset of the data satisfies the metric specified by the user.

In some embodiments, data selection system 202 can be a subsystem of a quantum computing interface system through which a user can submit data to quantum computers or devices for processing, and which renders or outputs results of the processing. In such embodiments, the data selection system 202 (or subsystem) can serve to select an optimal subset of the available data submitted by the user for input to one or more quantum devices.

Figure 3:
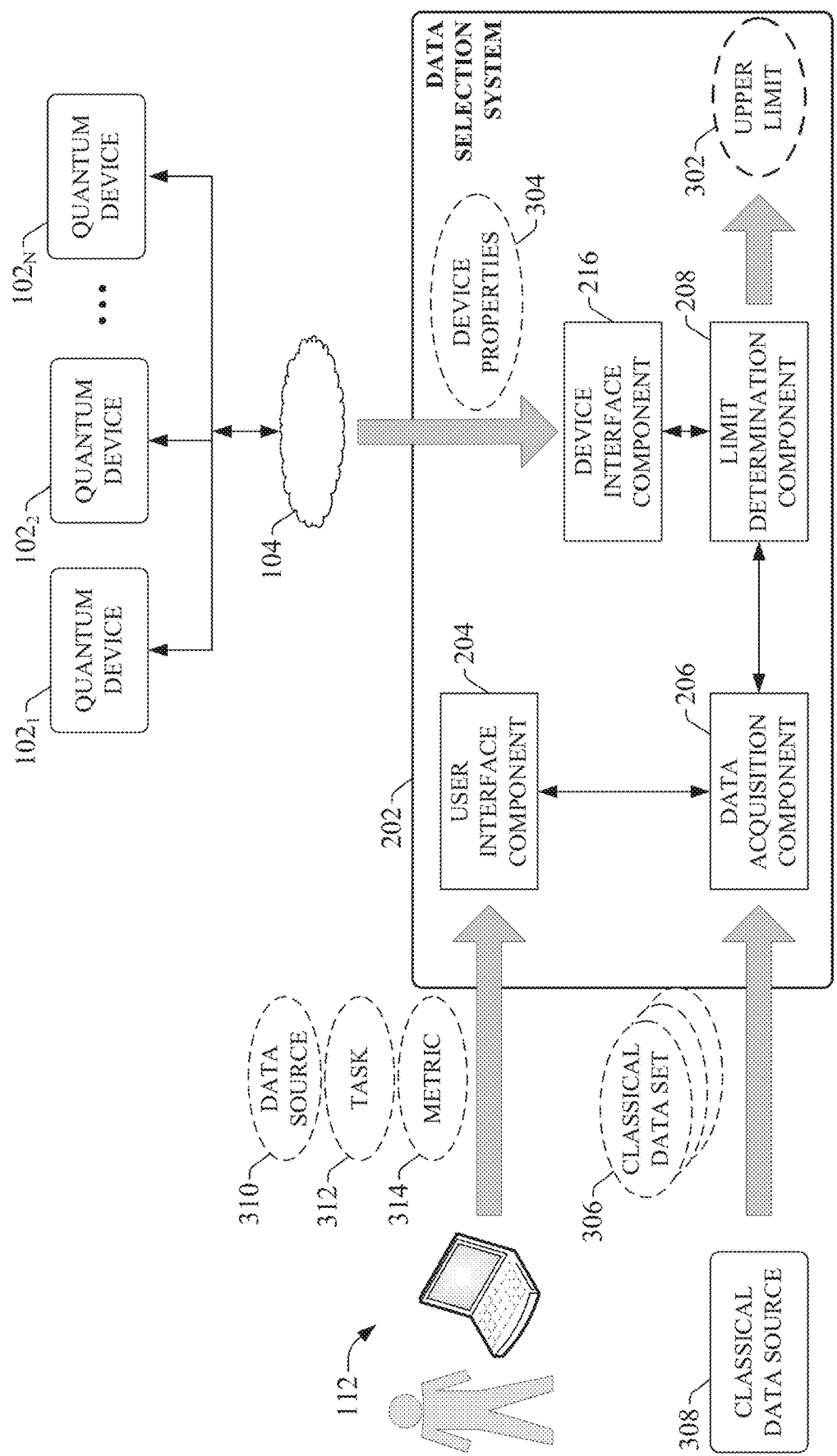
FIG. 3 is a diagram illustrating initiation of an analytic task to be performed by one or more quantum devices, as well as initiation of a routine for selecting a suitable subset of available classical data to be used as inputs for the analytic task.

The data selection approach implemented by embodiments of the data selection system 202 are now described within the context of a general data analytic task. FIG. 3 is a diagram illustrating initiation of an analytic task to be performed by one or more quantum devices 102, which also initiates the routine carried out by the data selection system 202 for selecting a suitable subset of available classical data to be used as inputs for the analytic task. Although examples illustrated and described herein assume that data source 308 is a source of classical data, data selection system 202 is not limited in its application to classical data, but rather can apply its data selection processing to substantially any type of data, including quantum data. In this example, a user at client device 112 wishes to perform a data analytic or processing task using a quantum algorithm executed by one or more available quantum devices 102. This example assumes an architecture similar to that depicted in FIG. 1, in which the set of available quantum devices $102_1$-$102_N$ reside on a cloud platform 104 and are accessible via the data selection system 202. In some embodiments, the data selection system 202 itself may also reside and execute on the cloud platform 104 as a cloud-based service accessible via client device 112 (e.g., as part of a quantum device interface system that serves as a gateway between the quantum devices $102_1$-$102_N$ and client devices 112) or may reside and execute locally on server or another computing device. The data selection techniques described herein are not limited to use within the context of the illustrated architecture, but rather can be applied within other architectures in which classical data 306 is to be input to one or more quantum devices 102.

To initiate the data analytic or processing task, the user can submit data source information 310 that specifies a source 308 of classical data 306 to be analyzed or processed, as well as task information 312 that specifies an analytic or processing task to be performed on the set of classical data 306 by one or more available quantum devices 102. The classical data source 308 can be, for example, a website, a data stream, a database or data repository, an image, one or more sensors, or other such data sources. The task to be performed on the data can comprise any suitable data processing or analysis application, including but not limited to classification (e.g., classification using a quantum-enhanced support vector machine, or QSVM), image encoding, credit risk assessment, or other such processing tasks. In some scenarios, the user can select this task at a high level and allow the system 202 to select a suitable algorithm for performing the selected task. Alternatively, the user may explicitly select an algorithm to be applied to the specified set of classical data 306.

In some quantum computing scenarios there may be a limit on the amount of classical data 306 that can be input to a given quantum device 102. If constraints of the quantum devices 102 preclude inputting the entire set of classical data 306, the data selection system 202 can execute a routine that selects a suitable subset of the classical data 306 to be used as inputs to one or more of the quantum devices 102. Careful selection of the subset of classical data 306 to be input to the quantum devices 102 is crucial, since the analytic results generated by the quantum devices 102 may not be sufficiently meaningful or accurate if the selected subset is not sufficiently representative of the classical data 306 as a whole, or otherwise does not satisfy a metric of analytic quality relevant to the particular task or application. To ensure that useful analytic results are obtained from a subset of the classical data 306, the system 202 can execute an iterative data selection routine that selects a suitable representative subset of the classical data 306 determined to satisfy an analytic performance metric.

Accordingly, the user interface component 204 allows the user to optionally provide metric information 314 specifying one or more performance metrics that will be used to evaluate the results obtained from the selected subset of classical data 306. A performance metric represents a measure of analytic quality, and may be specific to the task, algorithm, or application being applied to the data 306. Example performance metrics can include, but are not limited to, accuracy, execution time, calculation robustness, or other such performance metrics. In some embodiments, analytic results can be assessed against more than one performance metric, such that the overall analytic quality for a given subset of the classical data 306 is an aggregation of multiple performance metrics of interest. Some performance metrics can be generally applicable to all tasks or algorithms (e.g., execution time, calculation robustness, etc.), while other performance metrics can be specific to the chosen algorithm or task to be applied to the data 306 (e.g., classification accuracy in the case of QSVM). In some scenarios, rather than prompting the user to explicitly specify a performance metric to be used, the data selection system 202 can choose an appropriate performance metric based on the task or algorithm to be applied to the selected subset of classical data 306 (e.g., classification accuracy may be selected as the performance metric in the case of a classification algorithm). If more than one performance metric is specified, the performance metrics can be prioritized in terms of importance, and the analytics will be evaluated based on both how well each performance metric is satisfied as well as a relative importance of each performance metric.

The data acquisition component 206 obtains the set of classical data 306 from the one or more data sources 308 specified by the data source information 310. The data selection system 202 then analyzes the available quantum devices $102_1$-$102_N$ that are available to apply the specified algorithm to the data 306, and determines an upper limit 302 on the classical data 306 that can be input to each quantum device 102. In an example quantum computing landscape, there may be multiple different quantum devices 102 available, each having different capabilities and constraints (e.g., different qubits, connectivity properties, gate sets, nose levels, etc.). The device interface component 216 can obtain device property information 304 from the quantum devices $102_1$-$102_N$ to determine the respective devices' capabilities and constraints, and the limit determination component 208 determines the upper limit 302 for the respective devices 102 based on analysis of these device properties. The upper limit 302 can include both a maximum number of features and a maximum number of samples (e.g., rows and columns), as determined from the device property information 304. In an example scenario, the circuit depth limit may be determined based on variations that include noise adaptive layout optimizers or dense layout optimizers. In some embodiments, the upper limit determined by the limit determination component 208 can also include a temporal component, such that the upper limit 302 represents an amount of data that can be loaded to the device 102 within a defined period of time. This can ensure that an efficiency criterion is satisfied.

Figure 4:
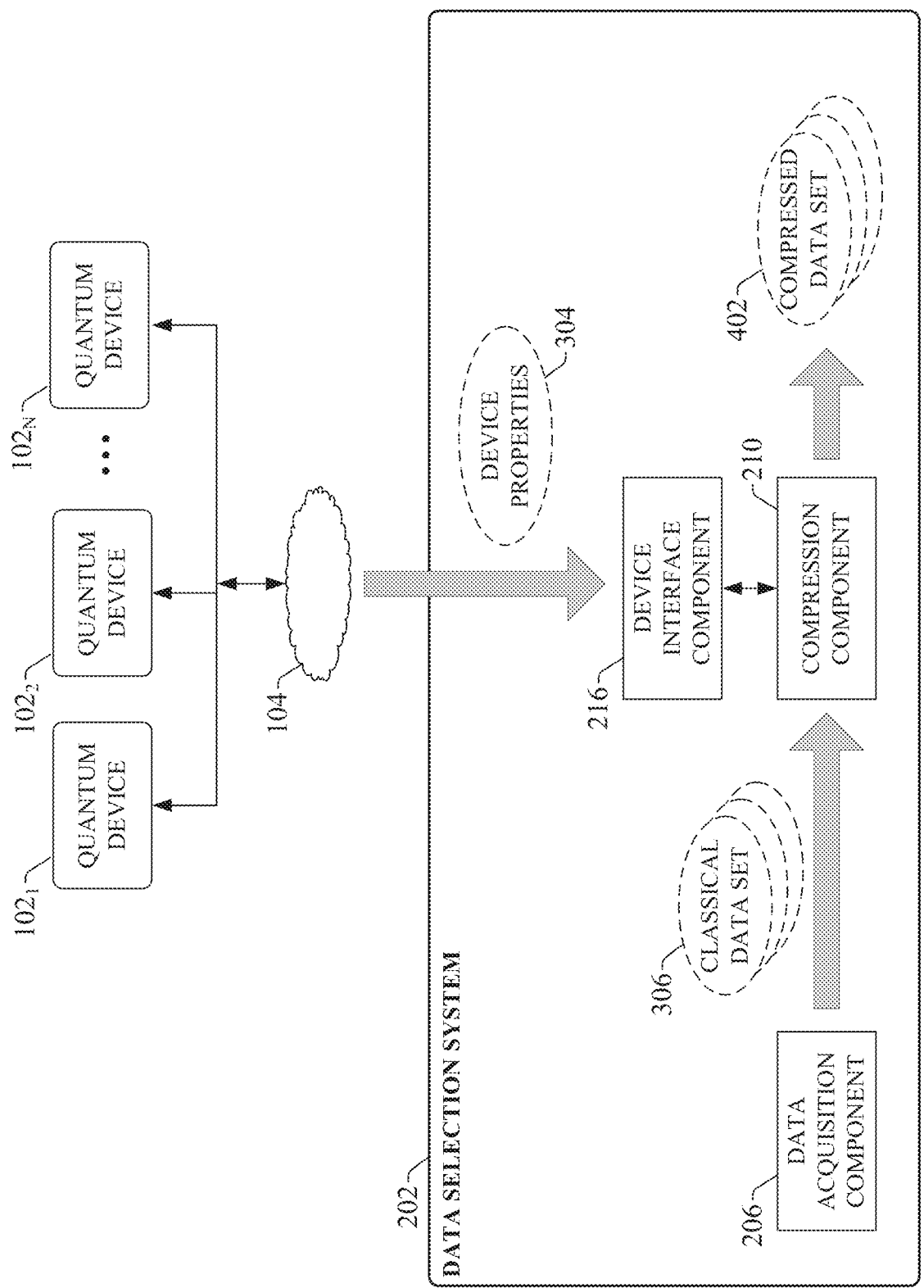
FIG. 4 is a diagram illustrating compression of classical data by a data selection system.

FIG. 4 is a diagram illustrating compression of the classical data by the data selection system 202. Once the set of classical data 306 has been acquired, a compression component 210 compresses the classical data 306 to yield compressed data 402. Compressing the data 306 increases the amount of meaningful data that can be input into a quantum device 102. Compression component 210 can compress the data 306 to a lower-dimensional space using any suitable technique, including but not limited to principal component analysis (PCA) or autoencoding. If the features of the data 306 have non-linear relationships, autoencoding may be a preferable approach. Otherwise, PCA may offer faster compression using fewer computational resources. Compression of the classical data 306 can depend on the device properties of the quantum devices 102 that are available. For example, the compression component 210 may compress the data 306 at a higher compression ratio if the quantum devices 102 are more constrained in terms of the amount of data that can be input (as determined from the device property information 304).

Figure 5:
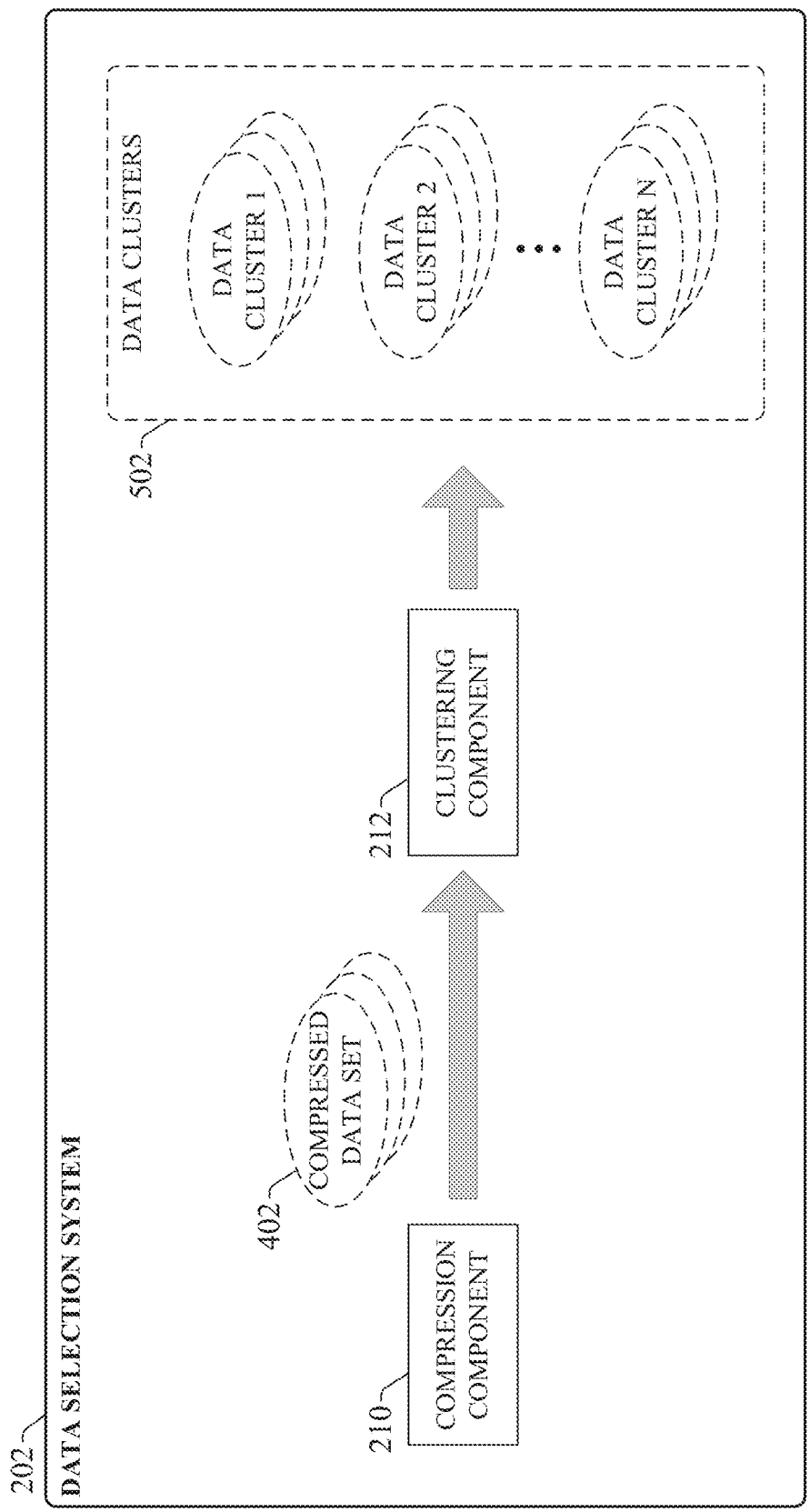
FIG. 5 is a diagram illustrating clustering of a compressed data set.

The classical data 306, now in the compressed latent space form, is clustered. FIG. 5 is a diagram illustrating clustering of the compressed data 402. A clustering component 212 clusters the compressed data 402 into data clusters 502 that reflect how the data is distributed, such that each data cluster 502 comprises a subset of the compressed data 402 having similar characteristics, features, or classifications. Any suitable clustering technique can be used, including but not limited to k-means clustering or quantum k-means clustering. The clustering of the compressed data 402 can depend on the task or algorithm to be applied to the data. For example, if the algorithm to be applied to the data is a credit risk analysis application, the set of classical data 306 may represent background data for a set of people across a range of demographics. Accordingly, the clustering component 212 may cluster the compressed data 402 according to demographic categories (e.g., according to age range, income range, or other such characteristics). Other clustering methodologies or criteria are also within the scope of one or more embodiments.

Figure 6:
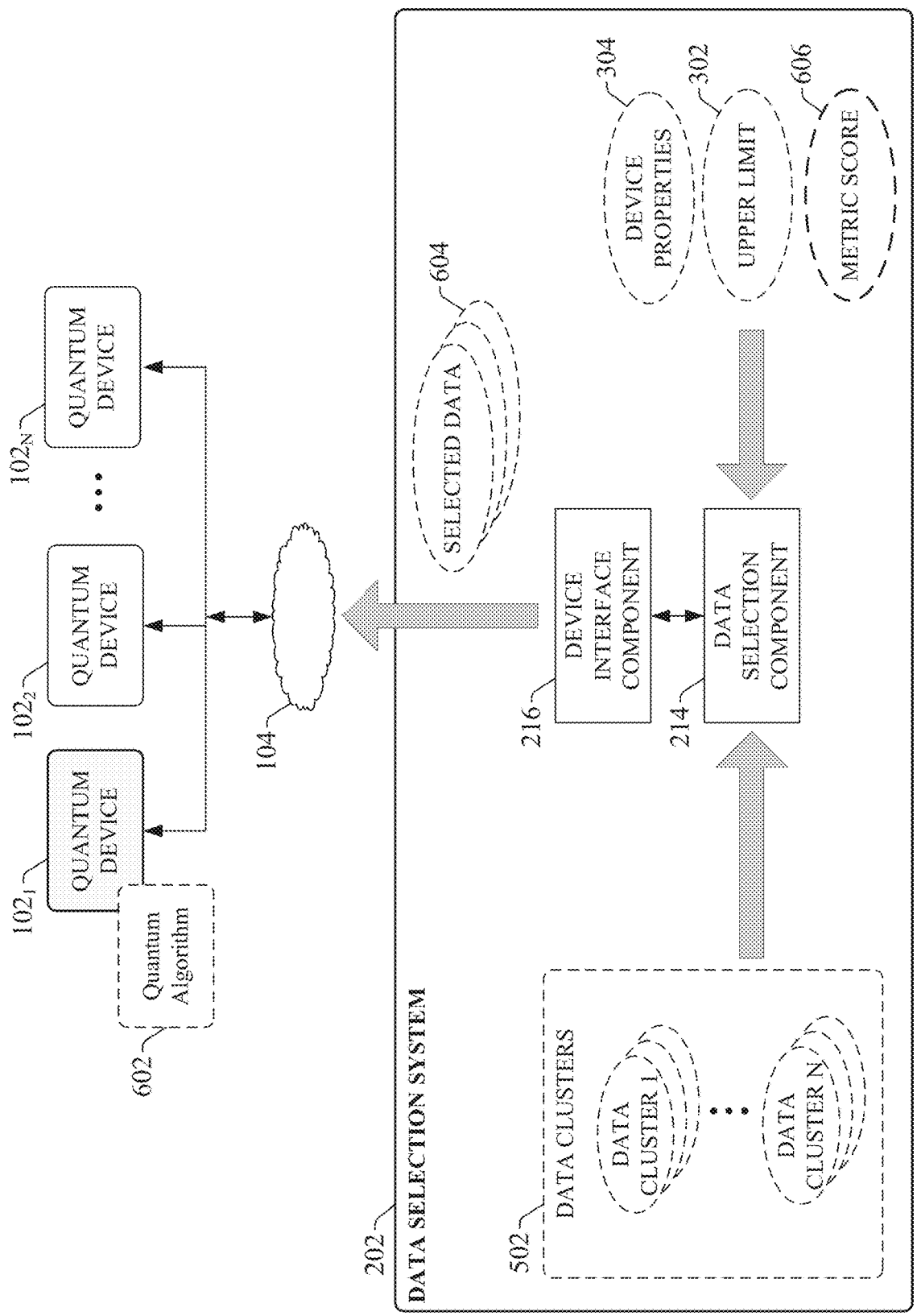
FIG. 6 is a diagram illustrating submission of a selected subset of classical data to a quantum device.

Once the data has been clustered, the data selection system 202 begins an iterative optimization routine whereby a selected subset of the compressed data 402 is selected to be sent to a selected one of the available quantum devices 102 for processing by the algorithm, and a performance metric is generated based on the result. FIG. 6 is a diagram illustrating submission of a selected subset of the data 604 to a selected quantum device 102. For each step of the iterative routine, the device interface component 216 selects one of the available quantum devices 102 according to any suitable set of criteria. For example, the device interface component 216 may select the quantum device 102 capable of accepting the greatest amount of input, as determined based on the device property information 304 obtained previously. In another example, the device interface component 216 may select from among the quantum devices $102_1$-$102_N$ at random. The device interface component 216 may also select a quantum device 102 that has been deemed most appropriate for the task or algorithm to be executed (e.g., based on a determination of which quantum device 102 has historically been used the most for the selected processing task). Alternatively, one of the quantum devices 102 may be explicitly selected by the user based on the user's quantum research experience. The topology of the data to be processed may also determine the selection of a quantum device 102. In some embodiments, the device interface component 216 may also use a machine learning algorithm to select a suitable quantum device 102. In the example depicted in FIG. 6, quantum device $102_1$ has been selected.

A data selection component 214 then selects an initial subset of the compressed classical data 604 determined to correspond to the most representative cases of the data, taking into account the upper limit 302 on data input for the selected quantum device $102_1$ as well as any other relevant, device-specific properties of the device $102_1$ (as determined from the previously obtained device property information 304). In an example scenario, the data selection component 214 can initially select one or more representative data points from each of the data clusters 502 in latent space (or from each of the largest clusters 502), where the selected data points are determined to be most representative of their corresponding clusters 502. In this way, all clusters 502—or the most significant clusters 502—are represented in the selected subset of data 604. This selection step selects both the best features and the best samples. Features are selected such that the principal components established during the compression step are, to the degree possible, equally represented. In some embodiments, the choice of quantum algorithm that will be applied to the data influences this selection of representative cases. That is, the representative cases can be selected based on algorithm-specific performance metrics. In some embodiments, selected representative cases can also vary depending on which gates and circuit elements are part of the quantum algorithm 602 to be executed, ensuring that individual quantum gates and circuit elements are included in the optimization.

The amount of data 604 selected can depend on the upper limit 302 for the selected quantum device $102_1$ as well as other properties or constraints of the device $102_1$. For example, if the selected quantum device $102_1$ is determined to have a high noise level and therefore requires additional redundancy, the device interface component 216 may select a greater amount of the compressed data than would be the case for a less noisy device (e.g., by selecting two data points from each cluster 502 rather than one).

Figure 7:
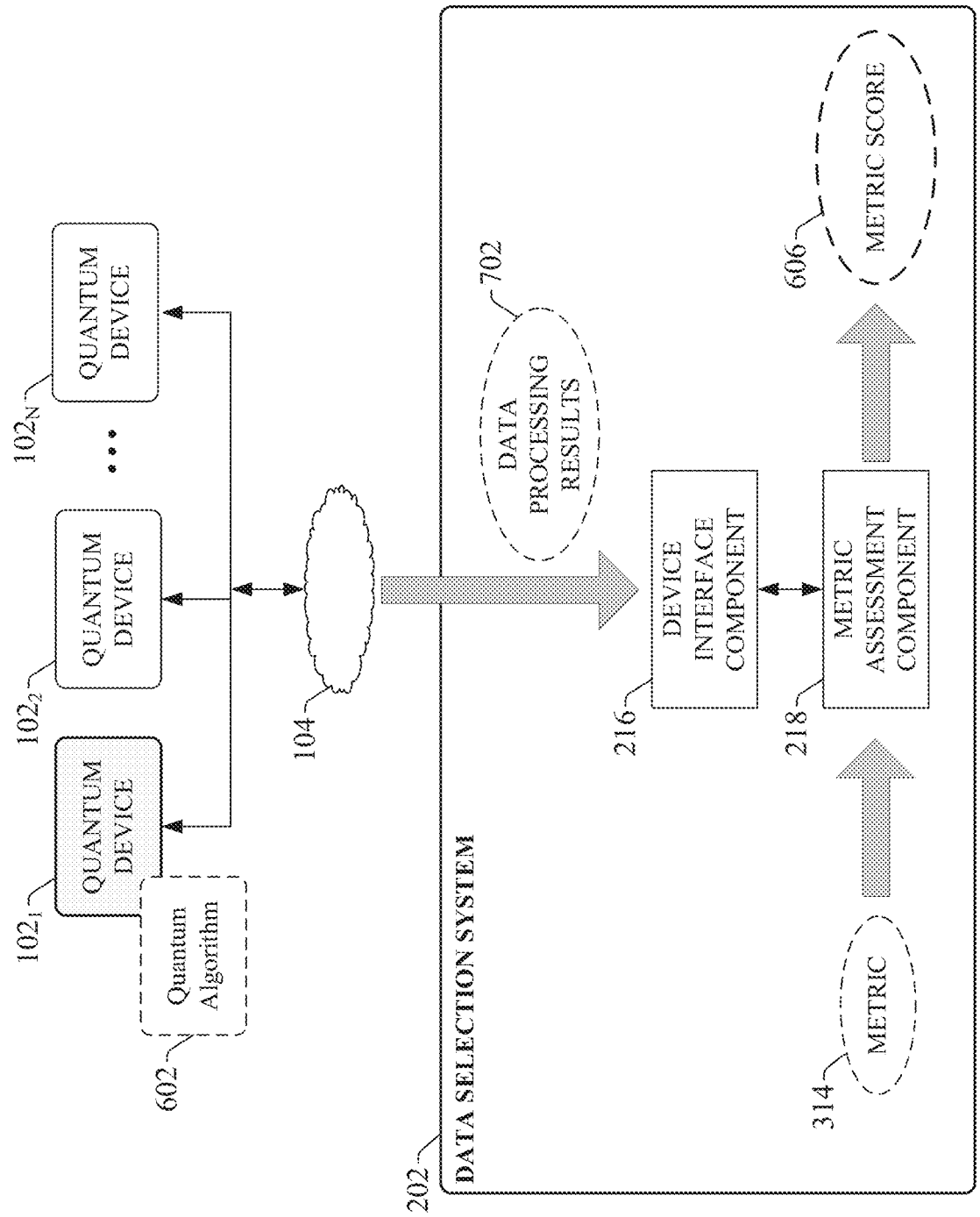
FIG. 7 is a diagram illustrating processing of analytic results to yield a metric score.

The device interface component 216 sends the selected subset of data 604 to the selected quantum device $102_1$ which executes the quantum algorithm 602 on the data 604. FIG. 7 is a diagram illustrating processing of the analytic results 702 to yield a metric score 606. The selected quantum device $102_1$ returns results 702 of the data processing to the data selection system 202. These results 702 are based on execution of the algorithm 602 on the selected subset of data 604. The results 702 are analyzed by a metric assessment component 218 relative to the performance metric (that is, the performance metric specified by the user via metric information 314, or a performance metric selected by the data selection system 202 based on the type of task or algorithm 602 being applied to the data 604). For example, if the selected performance metric is accuracy, the metric assessment component 218 can assess an accuracy of the results 702 and generate a metric score 606 representing a degree to which the result 702 satisfies the accuracy metric. If the selected metric is execution time, the metric assessment component 218 can determine a speed at which the quantum device $102_1$ processed the data 604 and generate the metric score 606 to reflect this speed.

In general, the data selection system 202 seeks to optimize the metric score 606 through repeated iterations of quantum device selection, data subset selection, algorithm execution, and metric score analysis. After the metric score 606 is generated for the previously selected subset of data 604 (as processed by the previously selected quantum device $102_1$), the system 202 revises the selected subset of data 604 based on the metric score 606 (or based on a difference between a current value of the metric score 606 and previous values of the metric score 606) and sends the updated subset of data 604 to the selected quantum device $102_1$ for processing by the algorithm 602. A new metric score 606 is then generated based on the new results 702 obtained from the updated subset of data 604. In some iterations, the choice of quantum device 102 may also be updated for some iterations of the optimization routine so that an optimal quantum device 102 for processing the selected subset of data 604 can be determined.

Updated selection of the subset of data 604 for a given iteration of the optimization routine can be based on a determination of whether the metric score 606 for a current iteration has improved or worsened relative to the metric scores 606 for previous iterations. For example, if the performance metric is accuracy and the metric score 606 for a current iteration indicates a 60% accuracy, the data selection component 214 can replace some portion of the subset of data 604 that was processed during the current iteration with different data items selected from the data clusters 502. This updated subset of data 604 can then be sent to the selected quantum device $102_1$ (or a different selected quantum device 102) and a new metric score 606 obtained. Rewards and penalties are assigned to the various data subset combinations based on whether the metric score 606 is improved (e.g., accuracy increases) or worsens (e.g., accuracy decreases), respectively.

Depending on how the metric scores 606 change over respective iterations of the optimization routine, the selection of representative cases—both features and samples—is updated. In some cases, this may involve replacing a subset of cases with new cases as the operation is typically at or near the data limit.

In some embodiments, the data selection system 202 can employ a reinforcement learning loop to penalize or reward selected subsets of data 604 (or portions of the selected data subsets) based on the metric scores 606 those subsets yield. Hard constraints, such as the previously determined upper limit 302, are used to prevent the data selection component 214 from selected an amount of data that exceeds the established limits of the selected quantum device 102.

For some performance metrics, the comparison between the desired output and the actual output may involve, for example, determining the smallest Hamming distance between a given output and one of the correct outputs, or a statistical comparison of output distributions (obtained over multiple iterations of the optimization routine).

In some embodiments, the hardware performance of the quantum device 102 used to carry out a given iteration of the optimization routine can also be recorded during the iteration. This can include recording, for example, the time to ingest the selected subset of data 604, the time to execute the algorithm 602, or other such hardware performance metrics. This hardware performance metric can be used by the system 202 to determine an optimal quantum device 102 to be used for processing the selected data 604 in parallel with determining an optimal subset of the data 604 to be used.

These iterative optimization steps—refining the selected subset of data 604 (and optionally the selection of quantum device 102), sending the refined subset of data 604 to the quantum device 102 for processing by the algorithm 602, generating a metric score 606 based on a determination of how well the processing results 702 satisfy one or more specified performance metrics, and further refining the selected subset of data 604 based on the new metric score 606—can be repeated until a defined termination criterion is satisfied. For example, some embodiments of the system 202 can execute iterations of the optimization routine until the metric score 606 reaches a defined target of acceptability. If the results 702 are being evaluated against multiple performance metrics (e.g., accuracy, processing speed, etc.), the system 202 can continue executing iterations of the optimization routine until the metric scores 606 for a specified number of the performance metrics achieve desired targets.

In another example, the optimization routine can continue executing iterations of the optimization routine until a specified time limit for execution of the routine has elapsed. In still another example, the system 202 can cease executing the optimization routine when a set number of iterations have been executed.

For a given iteration of the optimization routine, the device interface component 216 may either select a different quantum device 102 for execution of the algorithm 602 on the refined subset of data 604 or may execute the algorithm 602 on the same quantum device 102 that was selected for the previous iteration (that is, the selection of the quantum device 102 may remain fixed across iterations). For example, if it is known that a given quantum device 102 performs better than the other available devices 102 in terms of one or more performance metrics of interest (e.g., higher data limit, higher connectivity, less noise, etc.), the system 202 may send the selected subset of data 604 to this quantum device 102 for all iterations of the optimization routine, and only modify the selected subset of data 604 for each iteration. In another example, the system 202 may select a different quantum device 102 for certain iterations of the optimization routine—in addition to modifying the selection of the subset of data 604—and compare performance across the quantum devices 102 in terms of such factors as running cost, noise, queue time, or other such performance indicators. Once a determination is made as to whether one of the available quantum devices 102 yields better results than the other devices 102, the selection of this quantum device 102 may remain fixed for remaining iterations of the optimization routine. Thus, the system 202 can execute multiple iterations using multiple different quantum devices 102 executing the algorithm 602 on the same set of representative data, as well as different quantum devices 102 executing the algorithm 602 on different sets of representative data. In this way, the system 202 can identify both a suitable subset of data 604 as well as a suitable quantum device 102 for execution of the algorithm 602 on this selected subset of data 604 that yield satisfactory results 702.

Examples described above assume that the entire set of classical data 306 is initially compressed and clustered (see FIGS. 4 and 5), and that the iterative optimization routine selects subsets of this compressed and clustered data for each iteration, such that the data compression (latent space) and clusters remain fixed throughout the optimization routine. However, in some embodiments the compression and clustering steps can be performed for each iteration of the routine. In such embodiments, for a given iteration, the data selection component 214 may select a subset of the uncompressed and unclustered classical data 306 to be processed, and only this selected subset of classical data is compressed and clustered for use in the present iteration. This can allow the data clusters to vary across iterations if desired.

The approach described above for selecting a suitable subset of classical data for input into a quantum device can be applied within the context of substantially any type of quantum computing application or task. In an example use case involving image encoding, a user may wish to encode an image from a classical system to a quantum system to perform a quantum computing process. In this example case, the system 202 may contain information (e.g., device property information 304) about the available quantum devices 102 accessible to the user. The user can load the image to the system 202, or otherwise provide the location of the image to the system 202 (e.g., as data source information 310). The data acquisition component 206 can then acquire metadata from the image, including metadata indicating the size of the image, metadata indicating whether the image is a color or black-and-white image, or other such image metadata.

The system 202 can then identify the various forms of representing an image on a quantum device 102, such as Flexible Representation of Quantum Images (FRQI) or Novel Enhanced Quantum Representation (NEQR), and the clustering component can 212 map the individual image data (e.g., pixel data) to each representation form. The data selection component 214 can then sample a single pixel in each form and determine circuit requirements of the pixel (e.g., width, length, pixel type, color versus black-and-white, etc.). Then, the system 202 can generate a circuit of the single pixel representation in each form (e.g., FRQI, NEQR, etc.), and analyze the circuit based on techniques such as traspilation with optimizers (e.g., dense layout, noise-adaptive, etc.) to determine an optimal encoding (e.g., FRQI or NEQR).

The limit determination component 208 determines a maximum image size (e.g., an upper limit 302) using any suitable technique; e.g., by extending an individual pixel from an image size of 1×1 up to N×M, where N and M are integers greater than 1, until a threshold image size is reached. The threshold can be determined by assessing variations on increase of information loss, or can be a defined value for a given quantum device (e.g., as obtained based on Quantum Volume). The compression component 210 can determine the reduction size by mapping the maximum image size to the classical image, and generate a composite describing the reduction feature information to the user (e.g., recursive feature extraction or PCA).

The device interface component 216 can then send the selected compressed data 604 to a selected quantum device 102 and the quantum algorithm 602 can be applied to the data 604. Results 702 of this processing can be obtained and a metric score 606 can be generated (see FIGS. 6 and 7). The relevant steps of this process can be iterated multiple times, with the data selection component 214 modifying the selection of sampled pixels with respective iterations based on the metric score 606 obtained for the previous iteration. In some scenarios, the system 202 may also reiterate the clustering step that maps the individual image data to representation forms with each iteration. Alternatively, the initial clustering may remain fixed for all iterations. The steps are reiterated until a defined termination criterion is satisfied (e.g., the metric score 606 is within a defined range of a target score, a specified number of iterations have been executed, a specified time duration has elapsed, etc.), and the set of image data that was selected for the last iteration is output as the subset of classical image data to be used as input to the quantum device 102 to perform the image encoding.

The data selection approach implemented by embodiments of system 202 can ensure that a suitable subset of a larger set of classical data is selected for processing by a quantum algorithm, such that the selected subset of data will yield processing results that satisfy one or more metrics of processing quality (e.g., accuracy, execution time, robustness, etc.). This approach considers properties of the quantum computing setting (e.g., the limits on how much classical data can be loaded to the quantum device, capabilities or constraints of the available quantum devices, etc.) as well as requirements of the algorithm or processing task to be executed. In some implementations, the data selection system 202 can be a component or sub-system of a classical-quantum integration interface, allowing classical data sources to be integrated with quantum devices. This can include executing the data selection system 202 as a cloud-based service for clients within to access one or more cloud-based quantum computers.

Figure 8A:
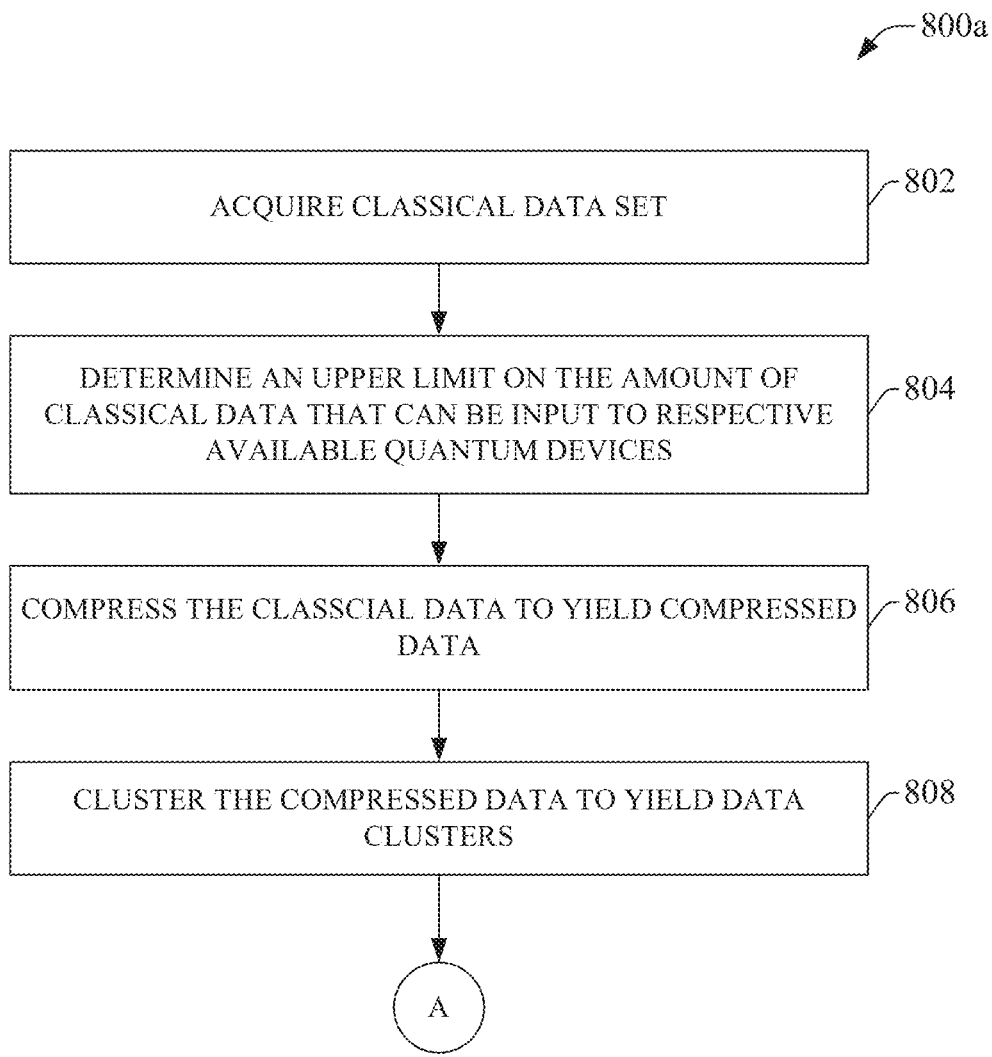
FIG. 8*a* illustrates a first part of a flow diagram of an example, non-limiting computer-implemented method for selecting a suitable subset of classical data that, when processed by a quantum algorithm, yields a result that satisfies one or more performance metrics.
Figure 8B:
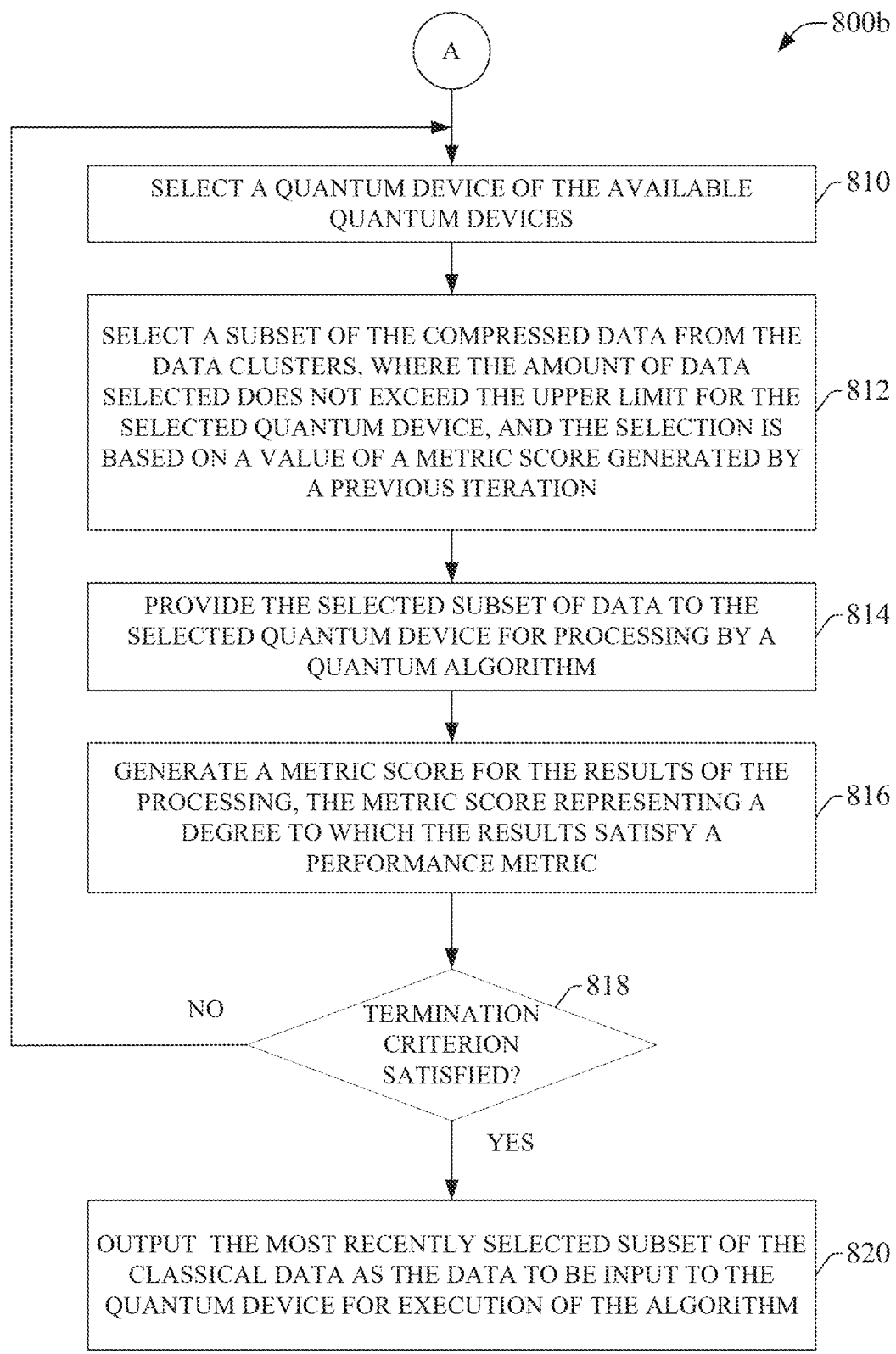
FIG. 8*b* illustrates a second part of the flow diagram of an example, non-limiting computer-implemented method for selecting a suitable subset of classical data that, when processed by a quantum algorithm, yields a result that satisfies one or more performance metrics.

FIGS. 8a-8b illustrate a methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 8a illustrates a first part of an example methodology 800a for selecting a suitable subset of classical data that, when processed by a quantum algorithm, yields a result that satisfies one or more performance metrics. Initially, at 802, a classical data set can acquired (e.g., by data acquisition component 206). The data set may be submitted by a user or may be obtained from a data source (e.g., a website, a database, an image, etc.) specified by the user. At 804, an upper limit on the amount of classical data that can be input to respective available quantum devices can be determined (e.g., by limit determination component 208). This determination can be made based on known or obtained capabilities or constraints of the quantum devices.

At 806, the classical data obtained at step 802 can be compressed to yield compressed data (e.g., by compression component 210). The data can be compressed to a lower-dimensional space using any appropriate compression technique, including but not limited to PCA or autoencoding. At 808, the compressed data obtained at step 806 can be clustered to yield data clusters (e.g., by clustering component 212). In some embodiments, k-means clustering can be used to cluster the compressed data. However, other clustering techniques are also within the scope of one or more embodiments.

The methodology then continues with the second part 800b illustrated in FIG. 8b. At 810, a quantum device can be selected from among the available quantum devices (e.g., by device interface component 216). The device can be chosen based on an explicit selection by the user, random selection, relative historical performances of the respective quantum devices, a determination of which device best suits the topology of the data to be processed, or other such selection criteria. At 812, a subset of the compressed and clustered data obtained via the first part of the methodology 800a can be selected (e.g., by data selection component 214), where the amount of data selected does not exceed the upper limit for the selected quantum device (as determined at step 804). If this is the initial iteration of the methodology, any technique for selecting this initial subset of data can be applied to yield a data subset determined to reflect the most representative cases of the classical data in terms of both features and samples. If this is not the initial iteration of the methodology, the selection can also be made based on a value of a metric score generated by a previous iteration (to be described at step 816 below).

At 814, the subset of data selected at step 812 can be provided to the quantum device that was selected at step 810 for processing by a quantum algorithm (e.g., by device interface component 216). At 816, a metric score can be generated for the results of the processing performed at step 814 (e.g., by metric assessment component 218). The metric score represents a degree to which the results of the processing satisfy a performance metric. The performance metric can be specific to the algorithm or processing task being applied to the data. Example performance metrics include, but are not limited to, accuracy, processing time, robustness, or other such metrics. In some embodiments, the processing results can be evaluated against than one performance metric, and as such may yield multiple metric scores.

At 818, a determination is made as to whether a defined termination criterion is satisfied (e.g., by metric assessment component 218). The termination criterion is a condition that terminates reiteration of steps 810-816 and ends the methodology. Example termination criteria can include, but are not limited to, a determination that the metric score generated at step 816 satisfies a measure of acceptance (e.g., whether the metric score is within a defined range of a target metric value), a determination that a specified number of metric scores are within their respective target ranges (in the case of evaluation for multiple performance metrics), execution of a specified number of iterations of steps 810-816, expiration of a defined time limit, or other such criteria.

If the termination criterion is not yet satisfied (NO at step 818), the methodology returns to step 810, and steps 810-818 are repeated. For this subsequent iteration, the subset of compressed data selected at step 812 is based in part on the metric score generated at step 816 of the previous iteration, or the direction and magnitude of the change in the metric score relative to one or more previous metric scores. For example, rewards or penalties can be assigned to certain features or samples of the data based on whether selection of these portions improves or worsens the metric score, and these rewards and penalties can be used to refine the selection of the data subset during each iteration of step 812. In some scenarios, the selection of quantum device at step 810 may also be changed between iterations, allowing the methodology to optimize the selection of quantum device in addition to the selection of classical data to be provided to the device. Alternatively, the selection of quantum device may remain fixed for all iterations if a preferred quantum device is already selected. At the end of each iteration, the new metric score is generated and used to refine the selections made for the subsequent iteration.

When the termination criterion is satisfied (YES at step 818), the methodology proceeds to step 820, where the most recently selected subset of the classical data can be output as the data to be input to the quantum device for execution of the algorithm (e.g., by data selection component 214). This finalized subset of the classical data, refined through repeated iterations of steps 810-818, are determined to yield meaningful processing results that satisfy the one or more specified performance metrics. This finalized subset of data can be provided to the selected quantum device for processing by the quantum algorithm, and the results obtained by this processing can be output as the final processing results.

In some embodiments, the methodology illustrated in FIGS. 8a-8b can be modified to include step 806 within the iterative loop, such that the classical data is re-clustered across iterations. Similarly, step 808 may also be included within the iterative loop in some embodiments, such that only the subset of data selected at step 812 is compressed before being sent to the quantum device.

Figure 9:
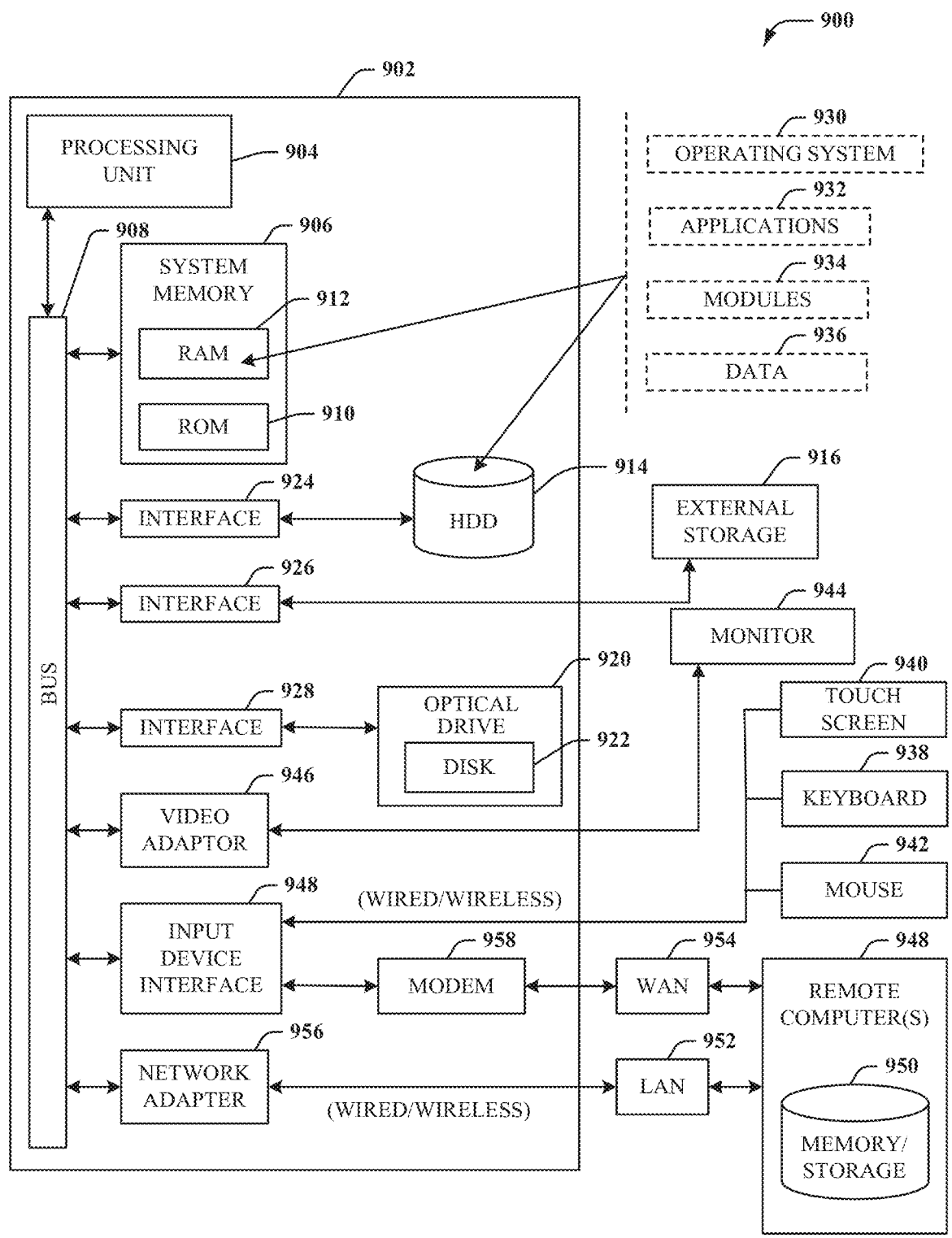
FIG. 9 illustrates a block diagram of an example, non-limiting operating environment in which one or more embodiments described herein can be facilitated.

In order to provide a context for the various aspects of the disclosed subject matter, FIG. 9 as well as the following discussion is intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

With reference to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for application programs 932. Runtime environments are consistent execution environments that allow application programs 932 to run on any operating system that includes the runtime environment. Similarly, operating system 930 can support containers, and application programs 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 948 that can be coupled to the system bus 908, but can be connected by other interfaces, such as a parallel port, an IEEE 1394 serial port, a game port, a USB port, an IR interface, a BLUETOOTH® interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless access point (AP) disposed thereon for communicating with the adapter 956 in a wireless mode.

When used in a WAN networking environment, the computer 902 can include a modem 958 or can be connected to a communications server on the WAN 954 via other means for establishing communications over the WAN 954, such as by way of the Internet. The modem 958, which can be internal or external and a wired or wireless device, can be connected to the system bus 908 via the input device interface 948. In a networked environment, program modules depicted relative to the computer 902 or portions thereof, can be stored in the remote memory/storage device 950. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 952 or WAN 954 e.g., by the adapter 956 or modem 958, respectively. Upon connecting the computer 902 to an associated cloud storage system, the external storage interface 926 can, with the aid of the adapter 956 and/or modem 958, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a defined structure as with a conventional network or simply an ad hoc communication between at least two devices.

Figure 10:
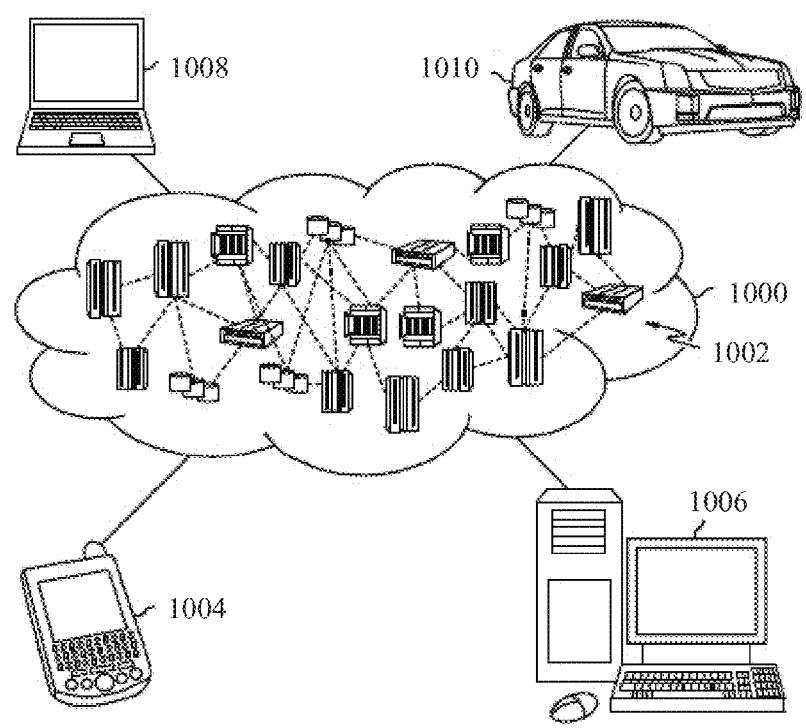
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
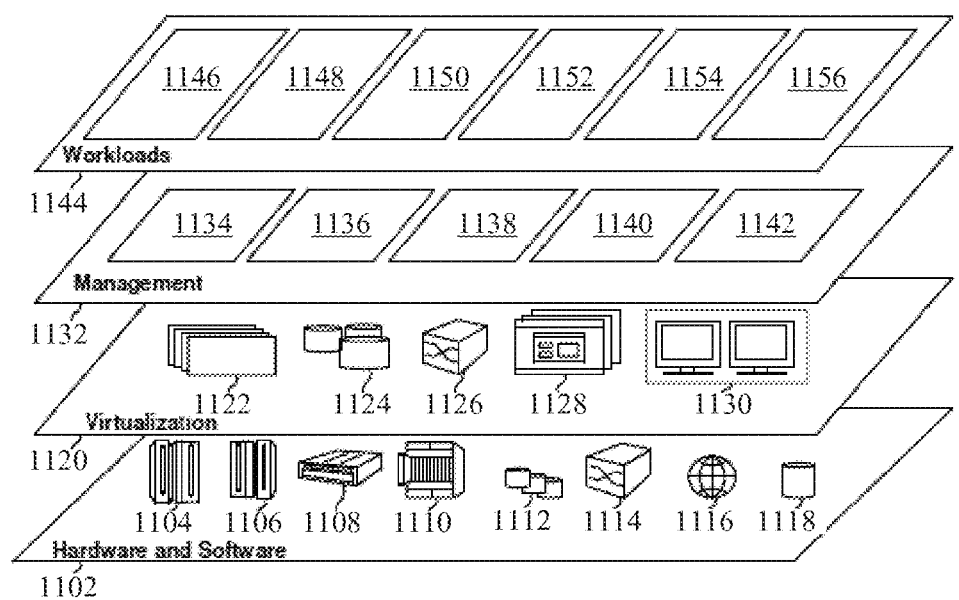
FIG. 11 depicts abstraction model layers in accordance with one or more embodiments described herein.

Referring now to FIG. 11, a set of functional abstraction layers provided by cloud computing environment 1000 (FIG. 10) is shown. Repetitive description of like elements employed in other embodiments described herein is omitted for sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and transfer learning processing 1156. Various embodiments of the present invention can utilize the cloud computing environment described with reference to FIGS. 10 and 11 to determine similarities between a given machine learning task and historical machine learning tasks and perform transfer learning processes on artificial intelligence models generated by automated machine learning based on the determined similarities.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a processor that executes computer-executable components stored in memory, wherein the computer-executable components comprise:
        a data selection component that, for an iteration of a data selection routine, selects, from a set of data, a subset of the data to be processed by a quantum algorithm on a quantum device; and
        a metric assessment component that, for the iteration of the data selection routine, generates a metric score for a result of processing the subset of the data by the quantum algorithm, the metric score representing a degree to which the result satisfies a processing performance metric,
    wherein
        the data selection component modifies the subset of the data selected for a subsequent iteration of the data selection routine based on the metric score to yield a modified subset of the data, and the computer-executable components further comprise a device interface component that, in response to a determination that a termination criterion for the data selection routine is satisfied, outputs the modified subset of the data generated by a most recent iteration of the data selection routine as input to the quantum device, and wherein the device interface component, for the iteration of the data selection routine, selects the quantum device on which to process the subset of the clustered data from multiple available quantum devices, and the data selection component selects the subset of the data based on at least one of a capability or a constraint of the quantum device determined based on device property information for the quantum device.

2. The system of claim 1, further comprising a clustering component that clusters the set of data to yield clustered data,
    wherein the data selection component selects the subset of the data from the clustered data.

3. The system of claim 2, further comprising a compression component that compresses the set of data or the clustered data.

4. The system of claim 3, wherein the compression component compresses the set of data or the clustered data using at least one of principal component analysis or autoencoding.

5. The system of claim 2, wherein the clustering component clusters the set of data into data clusters according to at least one of a characteristic, a feature, or a classification determined based on a type of the quantum algorithm.

6. The system of claim 5, wherein the data selection component selects the subset of the data such that each of the data clusters is represented in the subset of the clustered data.

7. The system of claim 1, wherein the processing performance metric is at least one of accuracy, execution time, calculation robustness.

8. The system of claim 1, wherein the metric assessment component selects the processing performance metric based on a type of the quantum algorithm.

9. The system of claim 1, wherein
the device determination component determines an upper limit on an amount of data that can be input to the quantum device based on device property information for the quantum device, and
the data selection component selects, as the subset of the data, an amount of the data equal to or less than the upper limit.

10. The system of claim 1, wherein the data selection component modifies the subset of the data selected for the subsequent iteration based on a determination of whether the metric score has improved or worsened relative to a previous metric score generated for a previous iteration of the data selection routine.

11. The system of claim 1, wherein the termination criterion is at least one of the metric score being within a defined range of a target value, execution of a specified number of iterations of the data selection routine, or expiration of a time limit for execution of the data selection routine.

12. The system of claim 1, wherein the device interface component modifies selection of the quantum device for the subsequent iteration of the data selection routine based on the metric score.

13. A computer-implemented method, comprising:
for respective iterations of a data selection routine:
selecting, by a system operatively coupled to a processor, from a set of data, a subset of the data to be processed by an algorithm on a quantum device;
generating, by the system based on analysis of a result of processing the subset of the data by the algorithm, a metric score that represents a degree to which the result satisfies a processing performance metric; and
modifying, by the system, selection of the subset of the data for a next iteration of the data selection routine based on the metric score to yield a modified subset of the data; and
in response to determining that a termination criterion for the data selection routine is satisfied, outputting, by the system, the modified subset of the data generated by a most recent iteration of the data selection routine as input to the quantum device, and wherein for the iteration of the data selection routine, selecting the quantum device on which to process the subset of the clustered data from multiple available quantum devices, and selecting the subset of data based on at least one of a capability or a constraint of the quantum device determined based on device property information for the quantum device.

14. The computer-implemented method of claim 13, further comprising clustering, by the system, the set of data to yield clustered data,
wherein the selecting of the subset of the data comprises selecting the subset of the data from the clustered data.

15. The computer-implemented method of claim 14, further comprising at least one of:
compressing, by the system, the set of data prior to the clustering, or
compressing, by the system, the subset of the data prior to the sending.

16. The computer-implemented method of claim 14, wherein
the clustering comprises clustering the set of data into data clusters according to at least one of a characteristic, a feature, or a classification determined based on a type of the algorithm, and
the selecting comprises selecting the subset of the data such that each of the data clusters is represented in the subset of the data.

17. The computer-implemented method of claim 13, wherein the processing performance metric comprises at least one of accuracy, execution time, or calculation robustness.

18. A computer program product comprising a computer-readable storage medium having program instructions embodied therewith, the program instructions executable by a processor to cause the processor to:
for respective iterations of a data selection routine:
select, by the processor, from a set of data, a subset of the data to be processed by an algorithm on a quantum device;
generate, by the processor based on analysis of a result of processing the subset of the data by the algorithm, a metric score that represents a degree to which the result satisfies a processing performance metric; and
modify, by the processor, selection of the subset of the data for a next iteration of the data selection routine based on the metric score to yield a modified subset of the data; and
in response to determining that a termination criterion for the data selection routine is satisfied, output, by the processor, the modified subset of the data generated by a most recent iteration of the data selection routine as input to the quantum device, and wherein for the iteration of the data selection routine, selecting the quantum device on which to process the subset of the clustered data from multiple available quantum devices, and selecting the subset of data based on at least one of a capability or a constraint of the quantum device determined based on device property information for the quantum device.

19. The computer program product of claim 18, wherein the program instructions executable by the processor further cause the processor to:
cluster, by the processor, the set of data to yield clustered data; and
select the subset of the data from the clustered data.

* * * * *